United States Patent [19]

Krey

[11] Patent Number: 4,591,153
[45] Date of Patent: May 27, 1986

[54] ARRANGEMENT OF CONTROL MEMBERS, ESPECIALLY FOR APPARATUS FOR HEATING AND VENTILATING DRIVER'S CABS, PASSENGER COMPARTMENTS, ETC. IN COMMERCIAL VEHICLES

[75] Inventor: Walter Krey, Mudau, Fed. Rep. of Germany

[73] Assignee: AURORA Konrad G. Schulz GmbH & Co., Mudau, Fed. Rep. of Germany

[21] Appl. No.: 649,860

[22] Filed: Sep. 12, 1984

[30] Foreign Application Priority Data

Sep. 13, 1983 [DE] Fed. Rep. of Germany ....... 3332984

[51] Int. Cl.⁴ .................................... B60H 1/02
[52] U.S. Cl. .......................... 237/12.3 R; 180/90
[58] Field of Search .............. 73/431; 237/12.3 R, 237/12.3 A, 12.3 B; 98/2, 2.05, 2.08; 165/42; 180/90; 296/70

[56] References Cited

U.S. PATENT DOCUMENTS 2,012,745  8/1935  Findley ..................... 237/12.3 B
2,707,079  4/1955  Little ........................ 237/12.3 B Primary Examiner—Henry Bennett
Attorney, Agent, or Firm—Becker & Becker, Inc.

[57] ABSTRACT

An arrangement of control members, especially for apparatus for heating and ventilating driver's cabs, passenger compartments, or the like in commercial vehicles. The arrangement includes a mounting plate with openings, into each of which a control member can be fixed in different angular positions. On the periphery of each opening, apertures are provided at equal angular distances apart. Each opening is associated on the display side of the mounting plate with an indicating panel, and on the rear side of the mounting plate with a fixing piece. The fixing piece and the indicating panel each have a flattened portion which enables a fixed position of the fixing piece relative to the indicating panel and relative to the control member.

11 Claims, 3 Drawing Figures

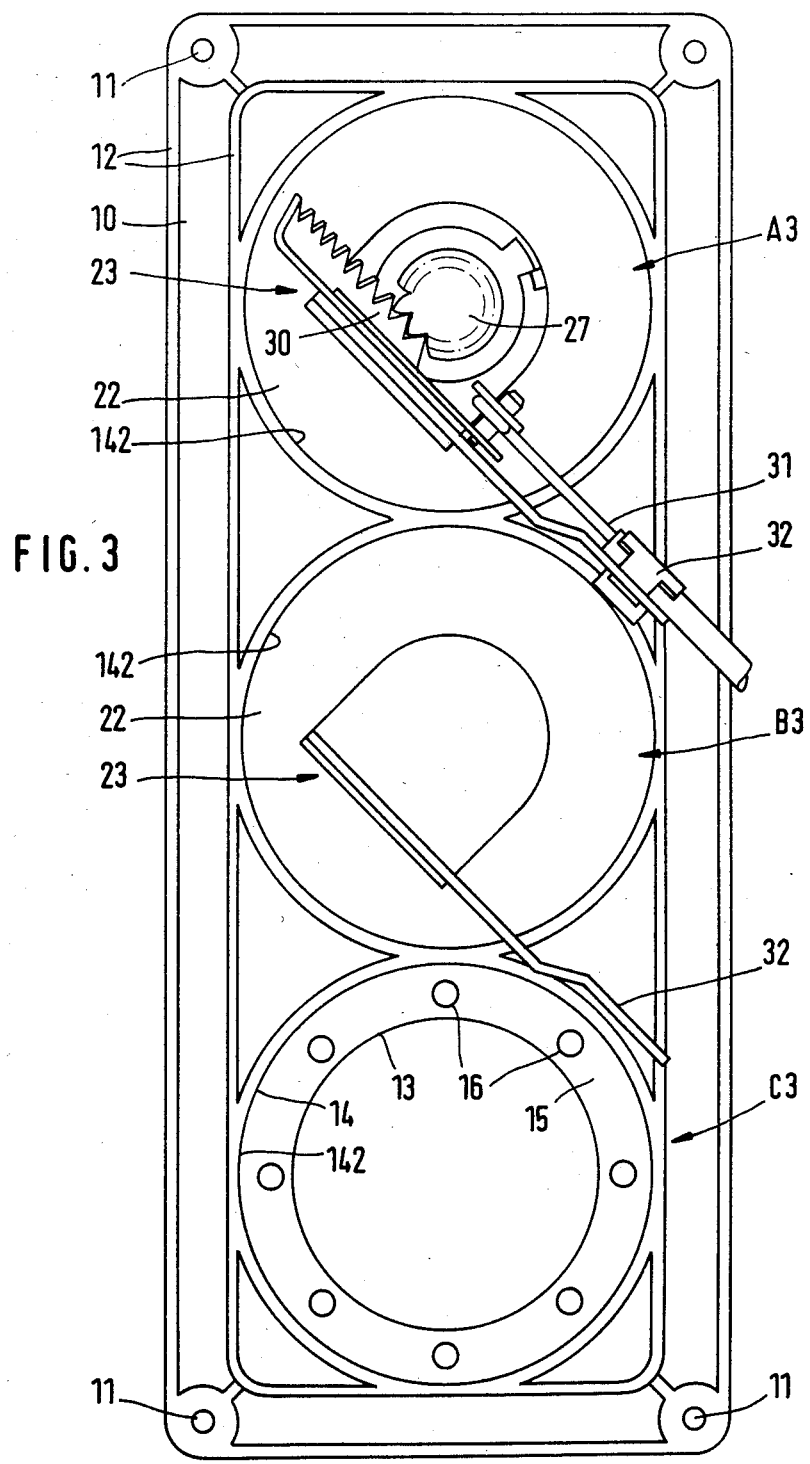

4,591,153

ARRANGEMENT OF CONTROL MEMBERS, ESPECIALLY FOR APPARATUS FOR HEATING AND VENTILATING DRIVER'S CABS, PASSENGER COMPARTMENTS, ETC. IN COMMERCIAL VEHICLES

BACKGROUND OF THE INVENTION

1. Field of the Invention

The present invention relates to an arrangement of control members, especially for apparatus for heating and ventilating driver's cabs, passenger compartments, or the like in commercial vehicles; a plurality of control members are held in place in a corresponding number of openings in a mounting plate.

2. Description of the Prior Art

For the remote control of air flaps, water valves, electric motors, for example via three-stage switches, etc., it is known to provide a mounting plate with openings into which the control members are accurately fitted, and wherein they are secured by screws. In this way the control members have a pre-determined position, and the wire lines or Bowden cables have to undergo sharp deflections on the rear side of the mounting plate so that they can be directed to the water lines, air ducts, heating units, etc. Apart from the fact that the known arrangement occupies a considerable amount of space on the rear side of the mounting plate, there is the danger of the Bowden cables being already damaged upon installation, or of damage occurring at the sharp kinks after only a short period of use. Furthermore, sharp deflections increase the frictional resistance during adjustment so that, as a result of the increased effort, damage to the control members can occur prematurely.

An object of the present invention therefore is to device an arrangement of control members for the connection of wire lines or Bowden cables and other control lines, which enables such lines or cables to be directed without obstruction, in particular without sharp deflections, from the respective control member to the adjusting element in water lines, air ducts, heating units, or the like.

BRIEF DESCRIPTION OF THE DRAWINGS

This object, and other objects and advantages of the present invention, will appear more clearly from the following specification in conjunction with the accompanying drawings, in which:

FIG. 3 is a rear view of the arrangement with an installed control member (A3), a diagrammatically installed control member (B3), and without control member (C3).

SUMMARY OF THE INVENTION

Figure 1:
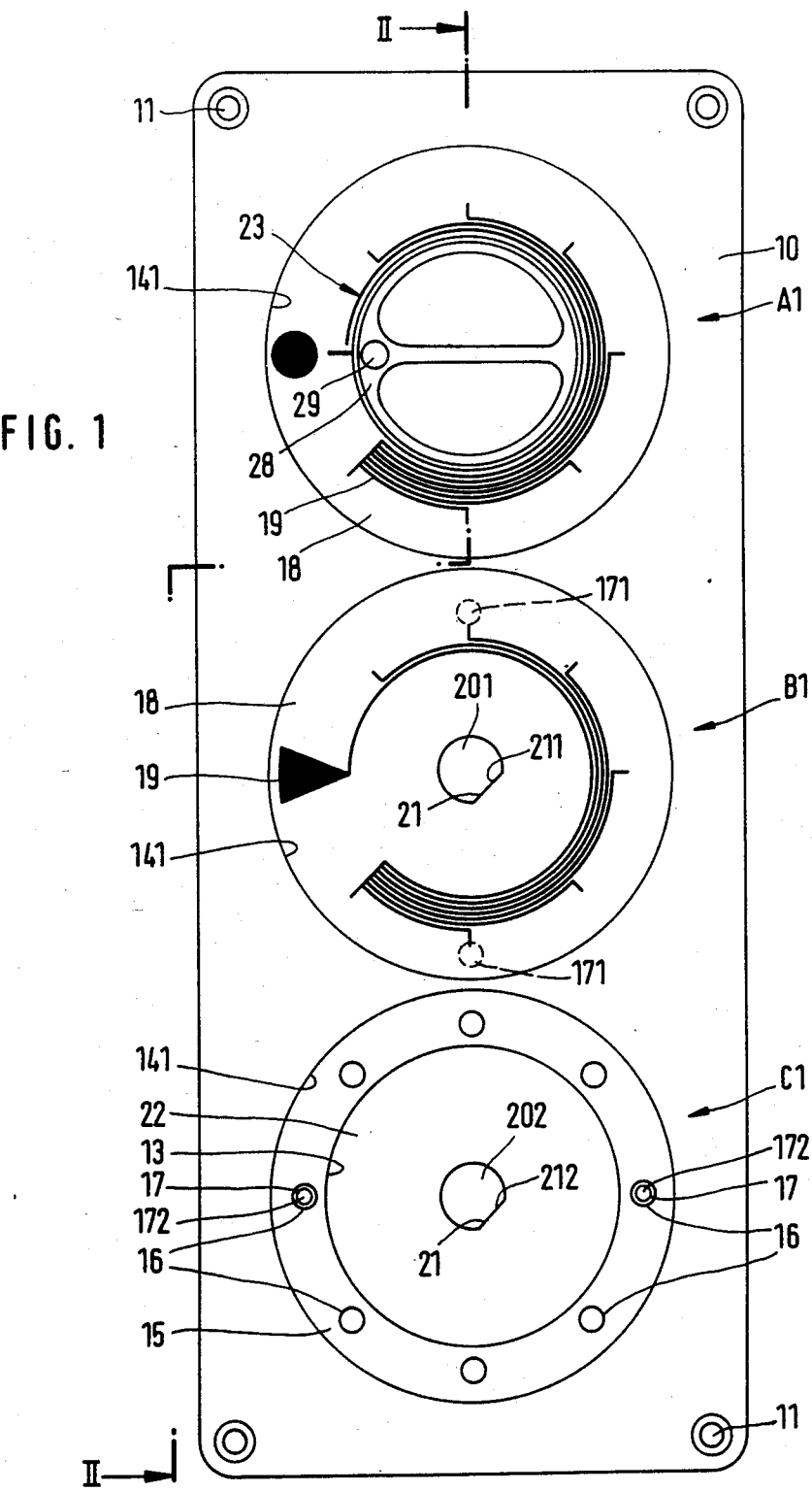
FIG. 1 is a plan view of an arrangement according to the invention with an installed control member (A1), an installed indicating panel (B1), and an installed fixing piece (C1)

The inventive arrangement of control members is characterized primarily in that apertures or recesses are spaced apart at equal angular distances on the periphery of each opening, with each opening being associated, on the display side of the mounting plate, with an indicating panel, and on the rear side of the mounting plate, with a fixing piece; the fixing piece and the indicating panel each have an element which enables a fixed position of the fixing piece relative to the indicating panel and relative to the control member, in a number of angular positions in relation to the mounting plate corresponding to the number of apertures or recesses.

The advantage is thereby achieved that the control members, for the connection of wire lines or Bowden cables and other control lines, can be so aligned relative to the mounting plate, after the installation of the mounting plate, that the wire lines or Bowden cables and other control lines can be directed without obstruction, i.e. without sharp deflections, from the control member to the adjusting element in water lines, air ducts, heating units, and the like; independently of the angular position of the control member, as a result of the co-rotation of the markings of the indicating panel, the indicator and the setting retain their fixed relative positions. Therefore, the arrangement need not be prefabricated, and there is even possible, during installation, not only to turn the control members about their own axis, but also to exchange one for another. The amount of space required behind the mounting plate is thereby reduced to a minimum. The arrangement according to the invention is therefore particularly suitable for driver's cabs, for example of tractors or construction machinery.

Pursuant to further advantageous features of the present invention, as recesses there may be provided apertures which are disposed at equal angular distances apart in the peripheral zone of each opening. The apertures may be disposed spaced apart at angular distances of 45°. The apertures may be of circular shape, and at least one pin may be disposed on each of the rear sides of the indicating panel and on the fixing piece; the pins may engage in separate apertures.

The element which determines the fixed position of the fixing piece relative to the indicating panel may be designed as a shoulder of a central hole of the indicating panel and of the fixing piece; the control member may have a collar which surrounds a control pin and which, on the outside, is provided with a flattened portion adapted to the element.

The collar on the control member may be designed as a threaded collar and, via a stop member and a cap nut, the fixing piece and the indicating panel may be retained in a specific angular position.

On at least one side of the mounting plate, the opening may be surrounded by a depression which forms a flange in which the apertures are provided. The portion of the indicating panel and/or the fixing piece disposed inside the opening may be thicker than the peripheral zone, and the total thickness of these portions may correspond to or be slightly less than the thickness of the flange.

The indicating panel and the fixing piece may be designed as identical molded parts, for example circular plates, and the indicating panel may be provided with markings which indicate the setting of the control member selected via a protruding control knob.

The mounting plate may have three openings, each for receiving a respective control member.

DESCRIPTION OF PREFERRED EMBODIMENTS

Figure 2:
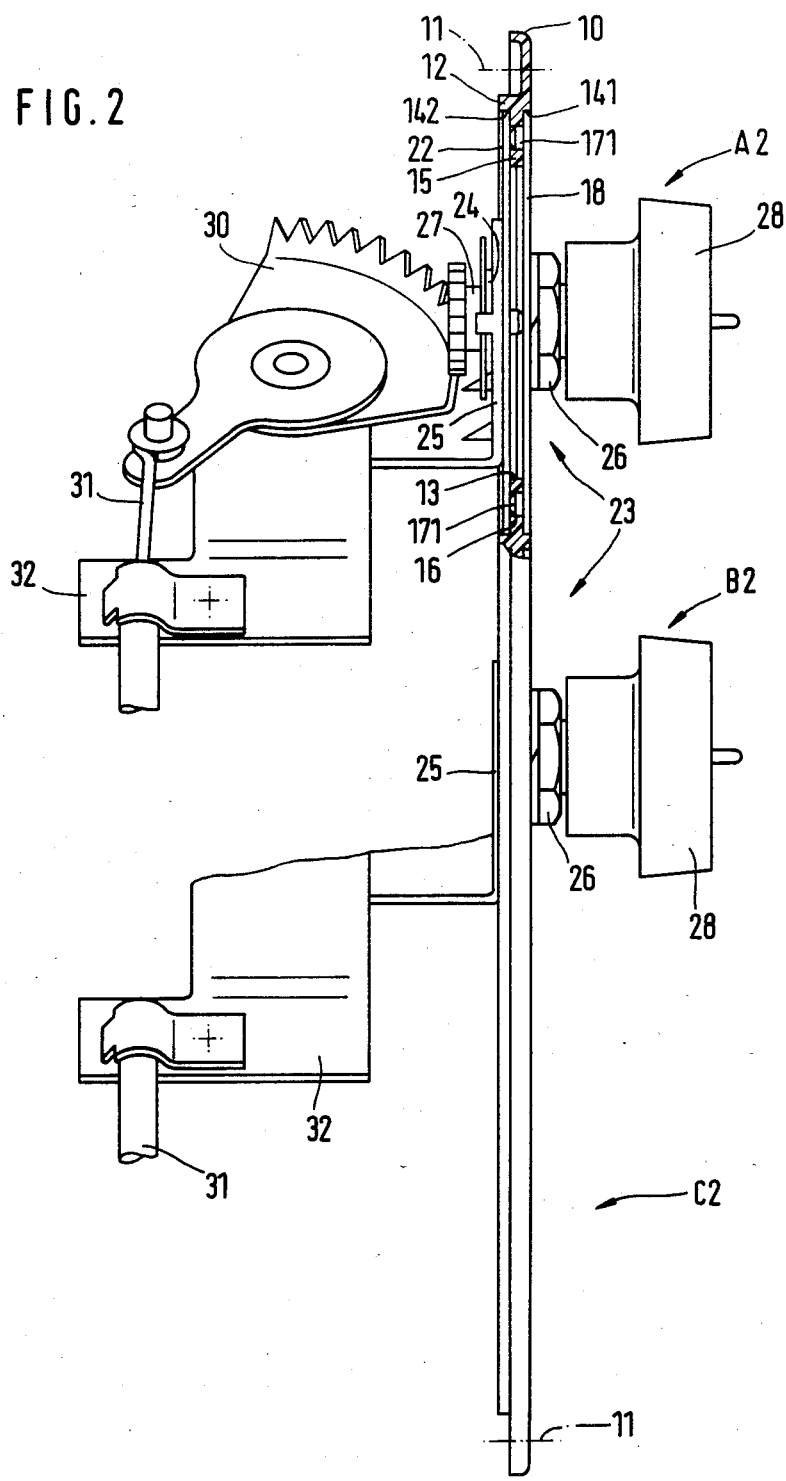
FIG. 2 is a side view of the arrangement according to FIG. 1 with a partial section taken along the line II—II in FIG. 1, and an installed control member (A2), a diagrammatically installed control member (B2), and without control member (C2)

Referring now to the drawings in detail, in the illustrated embodiment, a mounting plate 10 of rectangular cross-section is provided with four holes 11 which enable the mounting plate 10 to be secured, for example in a driver's cab in the vicinity of the instrument panel. The mounting plate 10 is advantageously made of plastic, and on the rear side has reinforcing ribs 12 (FIGS. 2 and 3).

In the illustrated embodiment, the mounting plate 10 is provided with three openings 13, each for receiving a respective control member. The number of openings 13 is determined by the proposed number of control members which are to be fitted. For certain purposes, two openings are sufficient; however, there is also the possibility of providing a plurality of openings 13 in a different arrangement in a mounting plate of different design.

In the illustrated embodiment, each opening 13 is provided on both sides of the mounting plate 10 with a depression 14, whereby a flange 15 is formed in which apertures 16 are provided. The apertures 16 are disposed spaced apart at equal angular distances of 45°. The angular spacing may also be 22.5°. Greater or smaller angular spacings are also possible. The apertures 16 are of circular shape and serve to receive correspondingly shaped pins 17.

An indicating panel 18 can be fitted into the recess or depression 141 incorporated in the display side or front side of the mounting plate 10. On its rear side, this panel 18 is provided with two pins 171 which are disposed diametrically opposite to one another. The pins 171 engage in two of the apertures 16 disposed opposite to one another. On the front side of the indicating panel 18 there are provided markings 19 which indicate the respective setting of the adjusting element (not shown). The indicating panel 18 is of circular shape, and has a central hole 201 with a shoulder 211.

On the rear side of the mounting plate 10, a fixing piece 22 is inserted into the recess or depression 142. In the illustrated embodiment, this fixing piece is likewise designed as a circular plate, and has two pins 172 disposed diametrically opposite to one another. The pins 172 engage in two of the remaining apertures 16. In the center of the plate 22 there is provided a central hole 202 having a shoulder 212. The indicating panel 18 and the fixing piece 22 are designed as identical molded parts, with the central holes 201 and 202, and also the shoulders 211 and 212, having similar or like dimensions.

The portion of the indicating panel 18 and/or the fixing piece 22 disposed inside the opening 13 is thicker than the peripheral zone, and the total thickness of these portions disposed inside the opening 13 corresponds to or is slightly less than the thickness of the flange 15. The indicating panel 18 and the fixing piece 22 can thus be held in place relative to the mounting plate 10. The indicating panel 18 and the fixing piece 22 each has an element 21 which makes possible a fixed positioning of the fixing piece 22 relative to the indicating panel 18 and relative to a control member 23 in a number of angular positions relative to the mounting plate 10 corresponding to the number of apertures 16. The markings 19 of the indicating panel 18 are in a fixed position relative to the shoulder 211 and the pins 171. Likewise in the case of the fixing piece 22, the shoulder 212 is in a fixed position relative to the pins 172. The position is chosen in such a way that only one pin 17, or 171, 172 respectively of the indicating panel 18 or of the fixing piece 22, projects into each aperture 16.

The control member 23 has an externally threaded collar 24, a stop member 25 which abuts against the fixing piece 22, and a cap nut 26 which can be screwed against the indicating panel 18 in order to hold together the indicating panel 18 and the fixing piece 22 and to hold the pins 17 inside the apertures 16. On the outside of the threaded collar 24 there is provided a flattened portion which comes into engagement with the element 21, or the projections 211 and 212, so as to ensure the fixed position of the fixing piece 22 relative to the indicating panel 18 and the control member 23.

A control pin 27 is rotatably mounted inside the threaded collar 24 and is provided with a control knob 28 on the front side of the mounting plate 10. This control knob 28 can be provided with a mark 29 which makes possible accurate coordination relative to the markings 19.

On the rear side of the mounting plate 10, the control member 23 has a gearing 30 which is firmly connected with the collar 24 and transmits the rotational movement of the control pin 27 to a Bowden cable 31. The support for the Bowden cable 31 is designated 32, and togehter with the control member 23 can be aligned in eight different angular positions—there being eight apertures 16.

Instead of the opening 13 being circular, the opening may be polygonal. The apertures 16 and the pins 17 then can be omitted if the thicker or reinforced portions of the indicating panel 18 and of the fixing piece 22 are designed and adapted to the shape of the opening 13. In this way, an even greater number of angular positions can be achieved.

Furthermore, the mounting plate 10 can be provided with openings for the connection of electrical switches.

The present invention is of course, in no way restricted to the specific disclosure of the specification and drawings, but also encompasses any modifications within the scope of the appended claims.

What I claim is:

1. An arrangement of control members, with a plurality of control members being adapted to be held in place in a corresponding number of openings in a mounting plate having a display side and a rear side remote from said display side; said arrangement further comprising the following features;

said mounting plate having recesses provided thereon around the periphery of each of said openings, said recesses being spaced apart around a given opening at equal angular distances;

an indicating panel is associated with each of said openings on said display side of said mounting plate; and a fixing piece is associated with each of said openings on said rear side of said mounting plate; each of said indicating panels and said fixing pieces is provided with an element which, in a number of angular positions relative to said mounting plate corresponding to the number of said recesses, permits a fixed allotment of said fixing pieces both relative to one of said indicating panels on one hand and relative to one of said control members on the other hand.

2. An arrangement according to claim 1, in which said recesses are apertures in said mounting plate which are disposed spaced apart at equal angular distances around the periphery of each of said openings.

3. An arrangement according to claim 4, in which said apertures are disposed at angular distances apart of 45°.

4. An arrangement of control members, with a plurality of control members being adapted to be held in place in a corresponding number of openings in a mounting plate having a display side and a rear side remote from said display side; said arrangement further comprising the following features:

said mounting plate having recesses provided thereon around the periphery of each of said openings, said recesses being spaced apart around a given opening at equal angular distances;

an indicating panel is associated with each of said openings on said display side of said mounting plate;

a fixing piece is associated with each of said openings on said rear side of said mounting plate; each of said indicating panels and said fixing pieces is provided with an element which, in a number of angular positions relative to said mounting plate corresponding to the number of said recesses, permits a fixed position about a given opening of one of said fixing pieces relative to one of said indicating panels and to one of said control members;

said recesses being apertures in said mounting plate which are disposed at equal angular distances apart around the periphery of each of said openings; and said apertures having a circular shape; in which each of said indicating panels has at least one pin disposed on that side thereof facing a fixing piece; and in which each of said fixing pieces has at least one pin disposed on that side thereof facing an indicating panel; said pins of said indicating panels and of said fixing pieces are adapted to engage in different ones of said apertures.

5. An arrangement of control members, with a plurality of control members being adapted to be held in place in a corresponding number of openings in a mounting plate having a display side and a rear side remote from said display side; said arrangement further comprising the following features:

said mounting plate having recesses provided thereon around the periphery of each of said openings, said recesses being spaced apart around a given opening at equal angular distances;

an indicating panel is associated with each of said openings on said display side of said mounting plate;

a fixing piece is associated with each of said openings on said rear side of said mounting plate; each of said indicating panels and said fixing pieces is provided with an element which, in a number of angular positions relative to said mounting plate corresponding to the number of said recesses, permits a fixed position about a given opening of one of said fixing pieces relative to one of said indicating panels and to one of said control members;

said recesses being apertures in said mounting plate which are disposed at equal angular distances apart around the periphery of each of said openings; and each of said indicating panels and said fixing pieces having a central hole having a respective shoulder which forms said element which determines the fixed position of said fixing piece relative to said indicating panel; and in which each of said control members has a control pin and a collar which surrounds said control pin and which is provided on its outside with a flattened portion adapted to said shoulders.

6. An arrangement according to claim 5, in which said collar is threaded, and in which each control member further includes a stop member and a cap nut for retaining said fixing piece and said indicating panel in a given angular position.

7. An arrangement of control members, with a plurality of control members being adapted to be held in place in a corresponding number of openings in a mounting plate having a display side and a rear side remote from said display side; said arrangement further comprising the following features:

said mounting plate having recesses provided thereon around the periphery of each of said openings, said recesses being spaced apart around a given opening at equal angular distances;

an indicating panel is associated with each of said openings on said display side of said mounting plate;

a fixing piece is associated with each of said openings on said rear side of said mounting plate; each of said indicating panels and said fixing pieces is provided with an element which, in a number of angular positions relative to said mounting plate corresponding to the number of said recesses, permits a fixed position about a given opening of one of said fixing pieces relative to one of said indicating panels and to one of said control members;

said recesses being apertures in said mounting plate which are disposed at equal angular distances apart around the periphery of each of said openings; and a depression surrounds each of said openings in said mounting plate on at least one of said sides of the latter, said at least one depression about a given opening forming a flange of said mounting plate in which said apertures are provided.

8. An arrangement according to claim 7, in which, in a given opening, portions of at least one of said indicating panel and said fixing piece are disposed therein, with these portions being thicker than the radially outer peripheral zones of said indicating panel and said fixing piece; the total thickness of these portions of indicating panel and said fixing piece correspond to or are slightly less than the thickness of said flange.

9. An arrangement of control members, with a plurality of control members being adapted to be held in place in a corresponding number of openings in a mounting plate having a display side and a rear side remote from said display side; said arrangement further comprising the following features:

said mounting plate having recesses provided thereon around the periphery of each of said openings, said recesses being spaced apart around a given opening at equal angular distances;

an indicating panel is associated with each of said openings on said display side of said mounting plate;

a fixing piece is associated with each of said openings on said rear side of said mounting plate; each of said indicating panels and said fixing pieces is provided with an element which, in a number of angular positions relative to said mounting plate corresponding to the number of said recesses, permits a fixed position about a given opening of one of said fixing pieces relative to one of said indicating panels and to one of said control members;

said recesses being apertures in said mounting plate which are disposed at equal angular distances apart around the periphery of each of said openings; and said control member including a control knob which projects from said display side of said mounting plate and serves for selecting the setting of said control member; in which said indicating panel and said fixing piece are designed as identical molded parts; and in which said indicating panel is provided with markings for indicating the setting of said control member.

10. An arrangement according to claim 9, in which said indicating panel and said fixing piece are circular plates.

11. An arrangement of control members, with a plurality of control members being adapted to be held in place in a corresponding number of openings in a mounting plate having a display side and a rear side remote from said display side; said arrangement further comprising the following features:

said mounting plate having recesses provided thereon around the periphery of each of said openings, said recesses being spaced apart around a given opening at equal angular distances;

an indicating panel is associated with each of said openings on said display side of said mounting plate;

a fixing piece is associated with each of said openings on said rear side of said mounting plate; each of said indicating panels and said fixing pieces is provided with an element which, in a number of angular positions relative to said mounting plate corresponding to the number of said recesses, permits a fixed position about a given opening of one of said fixing pieces relative to one of said indicating panels and to one of said control members; and said mounting plate being provided with three of said openings, each of which is adapted to receive a respective control member.

* * * * *